United States Patent
Min et al.

(10) Patent No.: US 11,887,008 B2
(45) Date of Patent: Jan. 30, 2024

(54) CONTEXTUAL TEXT GENERATION FOR QUESTION ANSWERING AND TEXT SUMMARIZATION WITH SUPERVISED REPRESENTATION DISENTANGLEMENT AND MUTUAL INFORMATION MINIMIZATION

(71) Applicant: NEC Laboratories America, Inc., Princeton, NJ (US)

(72) Inventors: Renqiang Min, Princeton, NJ (US); Christopher Malon, Fort Lee, NJ (US); Hans Peter Graf, South Amboy, NJ (US)

(73) Assignee: NEC Corporation, Tokyo (JP)

( * ) Notice: Subject to any disclaimer, the term of this patent is extended or adjusted under 35 U.S.C. 154(b) by 531 days.

(21) Appl. No.: 17/114,946

(22) Filed: Dec. 8, 2020

(65) Prior Publication Data

US 2021/0174784 A1    Jun. 10, 2021

Related U.S. Application Data

(60) Provisional application No. 62/945,270, filed on Dec. 9, 2019, provisional application No. 62/945,274, filed on Dec. 9, 2019.

(51) Int. Cl.
*G06N 3/08* (2023.01)
*G06N 3/088* (2023.01)
(Continued)

(52) U.S. Cl.
CPC ............ *G06N 3/088* (2013.01); *G06F 40/20* (2020.01); *G06N 3/08* (2013.01); *G06N 3/086* (2013.01); *G10L 15/063* (2013.01); *G10L 15/16* (2013.01); *G10L 15/22* (2013.01); *G06N 3/02* (2013.01); *G06N 3/082* (2013.01)

(58) Field of Classification Search
None
See application file for complete search history.

(56) References Cited

U.S. PATENT DOCUMENTS 10,373,055 B1 *   8/2019   Matthey-de-l'Endroit ..................
                                                  G06N 7/01
2018/0336184 A1 * 11/2018  Bellegarda .............. G06F 40/30

FOREIGN PATENT DOCUMENTS

CN        107291795 A      10/2017

OTHER PUBLICATIONS

John et al ("Disentangled Representation Learning for Non-Parallel Text Style Transfer" 2018) (Year: 2018).*

(Continued)

*Primary Examiner* — Lut Wong
(74) *Attorney, Agent, or Firm* — Joseph Kolodka

(57) ABSTRACT

Methods and systems for disentangled data generation include accessing a dataset including pairs, each formed from a given input text structure and a given style label for the input text structures. An encoder is trained to disentangle a sequential text input into disentangled representations, including a content embedding and a style embedding, based on a subset of the dataset, using an objective function that includes a regularization term that minimizes mutual information between the content embedding and the style embedding. A generator is trained to generate a text output that includes content from the style embedding, expressed in a style other than that represented by the style embedding of the text input.

18 Claims, 10 Drawing Sheets

(51) Int. Cl.
*G06F 40/20* (2020.01)
*G10L 15/06* (2013.01)
*G10L 15/16* (2006.01)
*G10L 15/22* (2006.01)
*G06N 3/086* (2023.01)
*G06N 3/02* (2006.01)
*G06N 3/082* (2023.01)

(56) References Cited

OTHER PUBLICATIONS

Poole et al ("On Variational Bounds of Mutual Information" 2019) (Year: 2019).*
Li et al ("Decomposable Neural Paraphrase Generation" Jun. 2019 (Year: 2019).*
Liu et al ("Bidirectional LSTM with attention mechanism and convolutional layer for text classification" Feb. 2019 (Year: 2019).*
Gholami et al, "Unsupervised Multi-Target Domain Adaptation: An Information Theoretic Approach", arXiv:1810.11547v1 [cs.CV]. Oct. 26, 2018. pp. 1-19.
Subramanian et al, "Multiple-Attribute Text Style Transfer", arXiv:1811.00552v2 [cs.CL]. Sep. 20, 2019. pp. 1-20.
Tishby et al, "The information bottleneck method", arXiv:physics/0004057v1 [physics.data-an]. Apr. 24, 2000. pp. 1-16.
Shen et al, "Style Transfer from Non-Parallel Text by Cross-Alignment", NIPS Conference 2017. Dec. 4-9, 2017. pp. 1-12.
Chen et al, "Isolating Sources of Disentanglement in VAEs", 2018 Conference on Neural Information Processing Systems. Dec. 3-8, 2018. pp. 1-11.
Kraskov et al, "Hierarchical Clustering Using Mutual Information", arXiv:q-bio/0311037v1 [q-bio.QM], Oct. 23, 2018, pp. 1-4, Julich, Germany.
Meila, "Comparing clusterings—an information based distance", Journal of Multivariate Analysis. vol. 98. Available online at www.sciencedirect.com. doi:10.1016/j.jmva.2006.11.013. Dec. 23, 2006, pp. 873-895.
Kullback et al, "On Information and Sufficiency", The Annals of Mathematical Statistics. Mar. 1, 1951. vol. 22, No. 1, pp. 79-86.
Hu et al, "Toward Controlled Generation of Text", Proceedings of the 34th International Conference on Machine Learning. inarXiv:1703.00955v4 [cs.LG] Sep. 13, 2018. pp. 1-10.
Liu et al, "Detach and Adapt: Learning Cross-Domain Disentangled Deep Representation", Proceedings of the IEEE Conference on Computer Vision and Pattern Recognition. Jun. 18-23, 2018. pp. 8867-8876.
Verma et al, "Generalized Zero-Shot Learning via Synthesized Examples", Proceedings of the IEEE Conference on Computer Vision and Pattern Recognition. Jun. 18-23, 2018. pp. 4281-4289.
Chou et al, "Multi-target Voice Conversion without Parallel Data by Adversarially Learning Disentangled Audio Representations", arXiv:1804.02812v2 [eess.AS]. Jun. 24, 2018. pp. 1-6.
Burgess et al, "Understanding disentangling in B-VAE", 31st Conference on Neural Information Processing Systems. Dec. 4-9, 2017. arXiv: 1804.03599v1 [stat.ML]. Apr. 10, 2018. pp. 1-11.
John et al, "Disentangled Representation Learning for Non-Parallel Text Style Transfer", Association for the Advancement of Artificial Intelligence. arXiv:1808.04339v2 [cs.CL]. Sep. 11, 2018. pp. 1-11.
Hsieh et al, "Learning to Decompose and Disentangle Representations for Video Prediction", 32nd Conference on Neural Information Processing Systems. Dec. 3-8, 2018. pp. 1-10.
Tran et al, "Disentangled Representation Learning GAN for Pose-Invariant Face Recognition", 2017 IEEE Conference on Computer Vision and Pattern Recognition. Jul. 21-26, 2017. pp. 1283-1292.
Belghazi et al, "Mutual Information Neural Estimation", Proceedings of the 35th International Conference on Machine Learning. Jul. 10-15, 2018. pp. 1-10.
Locatello et al., "Challenging Common Assumptions in the Unsupervised Learning of Disentangled Representations", Proceedings of the 36th International Conference on Machine Learning. Jun. 10-15, 2019. pp. 1-11.
Kingma et al., "Auto-Encoding Variational Bayes", arXiv: 1312.6114v10 [stat.ML]. May 1, 2014. pp. 1-14.
Zhou et al., "Talking Face Generation by Adversarially Disentangled Audio-Visual Representation", The 33rd AAAI Conference on Artificial Intelligence. Jan. 27-Feb. 1, 2019. pp. 9299-9306.
Chen et al., "InfoGAN: Interpretable Representation Learning by Information Maximizing Generative Adversarial Nets", 30th Conference on Neural Information Processing Systems. Dec. 5-10, 2016. pp. 1-9.
Lee et al., "Diverse Image-to-Image Translation via Disentangled Representations", Proceedings of the European Conference on Computer Vision. Sep. 8-14, 2018. pp. 1-17.
Poole, "On Variational Bounds of Mutual Information", Proceedings of the 36th International Conference on Machine Learning. Jun. 10-15, 2019. pp. 1-10.
Li et al., "Disentangled Sequential Autoencoder", Proceedings of the 35th International Conference on Machine Learning. Jul. 10-15, 2018. pp. 1-10.
Denton et al., "Unsupervised Learning of Disentangled Representations from Video", 31st Conference on Neural Information Processing Systems. Dec. 4-9, 2017. pp. 1-10.
Vineet John et al "Disentangled Representation Learning for Non-Parallel Text Style Transfer", Proceedings of the 57th Annual Meeting of the Association for Computational Linguistics, pp. 424-434, Jul. 2019 (pp. 424-426, 428; and figure 1).
Ben Poole et al., "On Variational of Mutual Information", arXiv: 1905.06922v1, May 2019 (pp. 1, 5).

* cited by examiner

Input: Data $\{x_j\}_{j=1}^{M}$, encoder $q_\theta(s, c|x)$, approximation network $p_\sigma(s|c)$.

for *each training iteration* do

Sample $\{s_j, c_j\}_{j=1}^{M}$ from $q_\theta(s, c|x)$;
　$\mathcal{L}(\sigma) = \frac{1}{M} \sum_{j=1}^{M} \log p_\sigma(s_j|c_j)$;
　Update $p_\sigma(s|c)$ by maximize $\mathcal{L}(\sigma)$;
　for $j = 1$ to $M$ do
　　Sample $k'$ uniformly from $\{1, 2, \ldots, M\}$;
　　$\hat{R}_j = \log p_\sigma(s_j|c_j) - \log p_\sigma(s_j|c_{k'})$;
　end
　Update $q_\theta(s, c|x)$ by minimize $\frac{1}{M} \sum_{j=1}^{M} \hat{R}_j + \text{MI}(s; c)$ end

FIG. 5

CONTEXTUAL TEXT GENERATION FOR QUESTION ANSWERING AND TEXT SUMMARIZATION WITH SUPERVISED REPRESENTATION DISENTANGLEMENT AND MUTUAL INFORMATION MINIMIZATION

RELATED APPLICATION INFORMATION

This application claims priority to U.S. Provisional Application Ser. No. 62/942,270, filed on Dec. 9, 2019, and to U.S. Provisional Application Ser. No. 62/945,274, filed on Dec. 9, 2019, incorporated herein by reference in their entirety.

BACKGROUND

Technical Field

The present invention relates to artificial intelligence and more particularly to a controlled text generation with supervised representation disentanglement and mutual information minimization.

Description of the Related Art

Language can be characterized in multiple distinct ways, such as by its semantic meaning and by its style. Disentangled representation learning (DRL), which maps different data attributes into different independent low-dimensional latent vector spaces, can be used in a variety of Natural Language Processing (NLP) tasks, such as conditional text generation, style transfer, personalized dialogue systems, text summarization, and so forth. Similar problems have been extensively studied for other forms of data, such as images and videos. However, the discrete nature of natural language makes the disentangling of textual representations more challenging (e.g., the manipulation over the data space cannot be easily achieved).

SUMMARY

A method for disentangled data generation includes accessing a dataset including pairs, each formed from a given input text structure and a given style label for the input text structures. An encoder is trained to disentangle a sequential text input into disentangled representations, including a content embedding and a style embedding, based on a subset of the dataset, using an objective function that includes a regularization term that minimizes mutual information between the content embedding and the style embedding. A generator is trained to generate a text output that includes content from the style embedding, expressed in a style other than that represented by the style embedding of the text input.

A system for disentangled data generation includes

A hardware processor and a memory. The memory stores a dataset including pairs, each formed from a given input text structure and a given style label for the input text structure. The memory also stores computer program code which, when executed by the hardware processor, implements training code that trains an encoder to disentangle a sequential text input into disentangled representations, including a content embedding and a style embedding, based on a subset of the dataset, using an objective function that includes a regularization term that minimizes mutual information between the content embedding and the style embedding, and that trains a generator to generate a text output that includes content from the style embedding, expressed in a style other than that represented by the style embedding of the text input.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5 is a diagram showing exemplary pseudocode for Algorithm 1, in accordance with an embodiment of the present invention;

DETAILED DESCRIPTION OF PREFERRED EMBODIMENTS

Embodiments of the present invention are directed to controlled text generation with supervised representation disentanglement and mutual information minimization.

Disentangled representations may be learned for textual information, for example generating representations that separately characterize semantic content and style. Different aspects of the input data may be mapped into distinct and independent low-dimensional latent vector spaces. Content embedding captures the semantic meaning of an input, while style input represents attributes of the text, such as sentiment and personality information.

Toward that end, supervision information, self-supervised information, and other auxiliary supervisory signals may be used to guide a variational autoencoder machine learning framework. The dependency between different factors, such as sentiment, writing style, content, and topic may be minimized using a sample-based mutual information upper bound. Although content and style are addressed specifically herein, it should be understood that any appropriate components of an input may be disentangled.

In accordance with one or more embodiments of the present invention, a method is proposed that effectively manifests disentangled representations of text without any supervised information of the available contents. Specifically, a mutual information upper bound may be derived to measure dependence between style and content presentations. By minimizing this upper bound, style embeddings and content embeddings may be embedded into two independent low-dimensional spaces.

In accordance with one or more embodiments of the present invention, a novel information theoretical text DRL framework is introduced. Representative latent embeddings (i.e. style and content embeddings) may be learned by maximizing mutual information between latent embeddings and original data. A model in accordance with the present invention reduces the dependency between style and content embeddings by minimizing the mutual information between the two embedding spaces.

In one or more embodiments, the present invention introduces an information-theoretical term to numerically measure the quality of disentangled representation learning.

In one or more embodiments, the present invention minimizes the upper bound of the measurement to propose a novel text representation disentangling method which explicitly reduce the correlation between embedding spaces.

In one or more embodiments, the present invention derives a new mutual information upper bound. By minimizing this upper bound, the dependency of style and content embedding spaces can effectively decrease.

Figure 1:
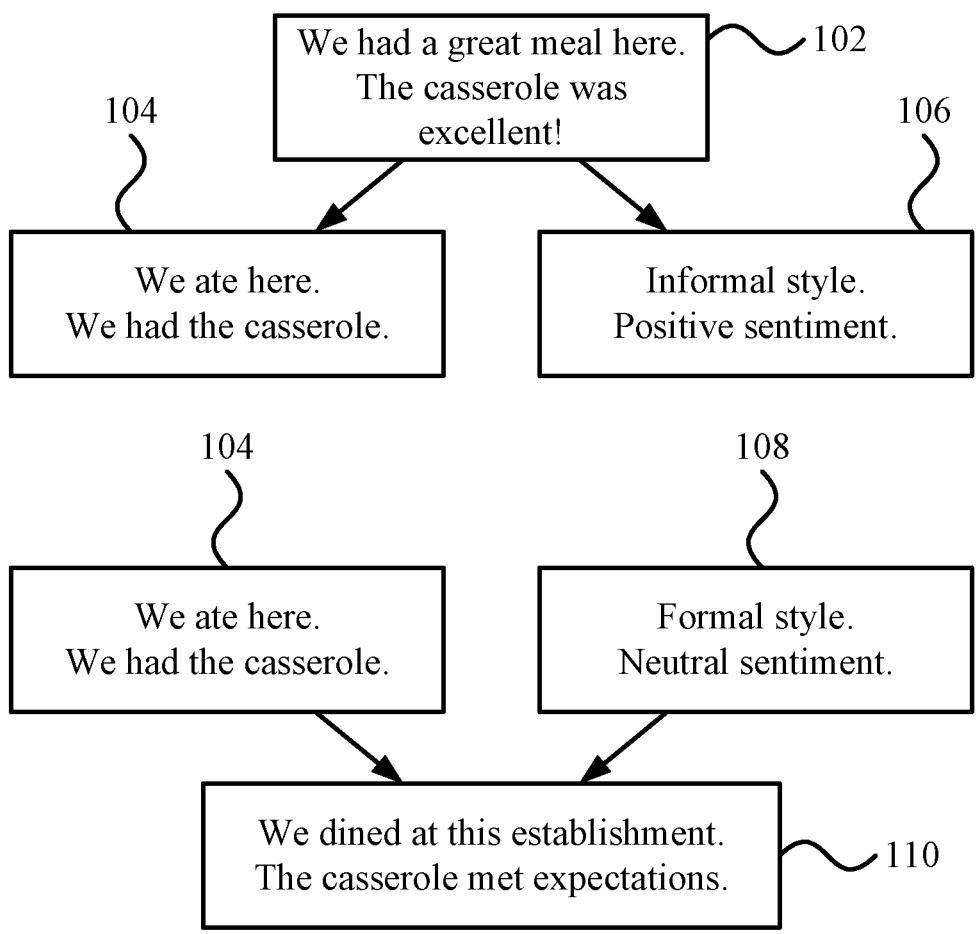
FIG. 1 is a block diagram showing the formation of disentangled representations of input text and the use of such disentangled representations in generating new text, in accordance with an embodiment of the present invention.

Referring now to FIG. 1, an exemplary input is shown, with different components of the input being disentangled. The original input 102 is a review for a restaurant, which can be broken down into its semantic content 104 and its style 106. The semantic content 104 may, for example, include the bare facts of the review, while the style 106 is shown as including a degree of formality and an overall sentiment.

Each of the components of the original input 102 may be represented as vectors in a low-dimensional latent space, where one vector's proximity to another captures a similarity between the information encoded in those vectors. Thus, the semantic content 104 may be represented as a first vector in a semantic space, where the meanings of the message is put into context against meanings of similar messages, while the style 106 may be represented as a second vector in a style space. These components of the original input 102 are separated to minimize the overlap in the information that they carry.

The content 104 may then be combined with a different style 108 to generate a new text output 110. The new style 108 is shown here as being a difference in formality and sentiment, but it should be understood that the new style 108 may represent any appropriate way of representing the semantic content 104. For example, the new style 108 may be a summary style, where the semantic content 104 is represented in concise language.

Figure 2:
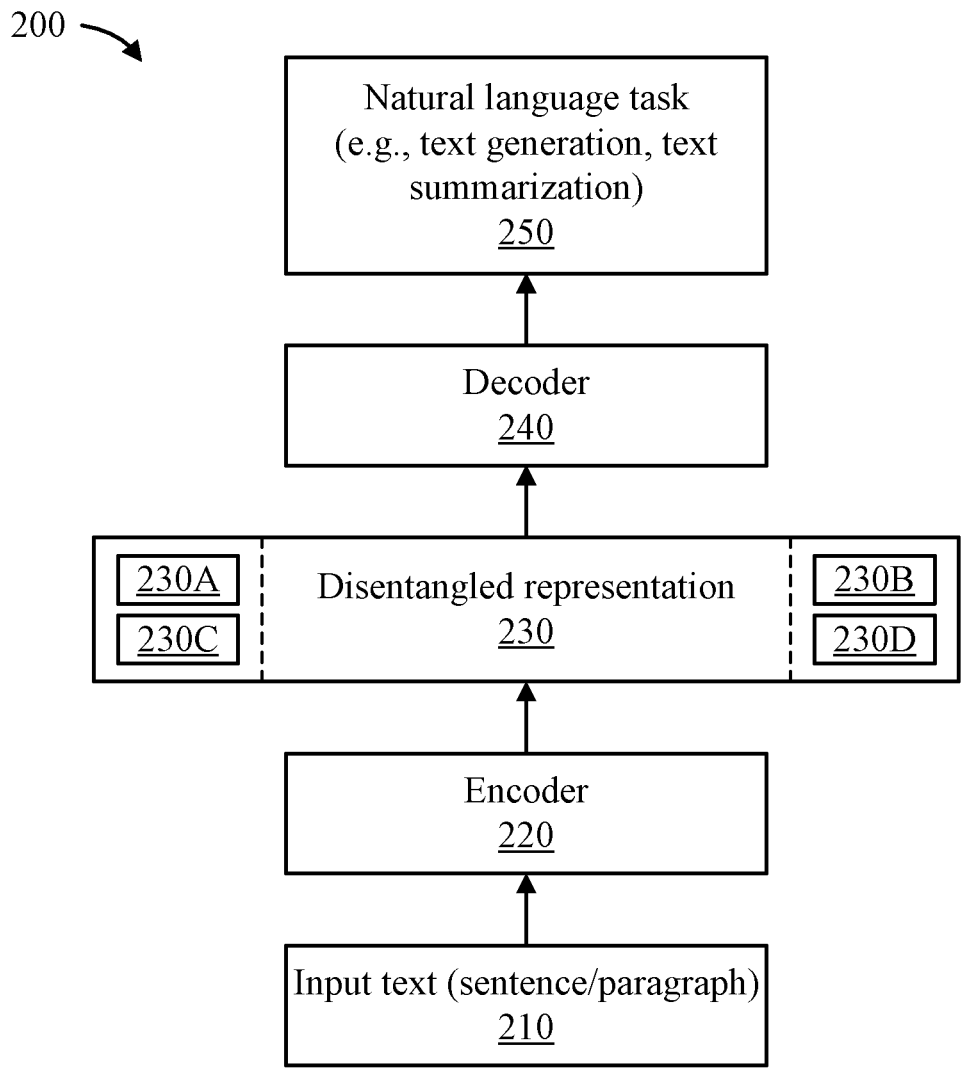
FIG. 2 is a block diagram showing an exemplary architecture, in accordance with an embodiment of the present invention.

FIG. 2 is a block diagram showing an exemplary architecture 200, in accordance with an embodiment of the present invention.

The architecture 200 includes an input sentence/paragraph 210, an encoder 220, a disentangled representation 230, a decoder 240, and reconstructed text (sentence/paragraph 250).

The disentangled representation 230 includes content with sentence reconstruction regularization 230A and style with label prediction regularization.

The input text 210 is provided to the encoder 220.

The encoder 220 encodes a disentangled representation 230 that includes sentence reconstruction regularization 230A and style with label prediction regularization 230B. The disentangled representation can further include mutual information minimization 230C and D between the content reconstruction regularization 230A and the supervised regularization 230B, respectively.

The decoder decodes the disentangled representation 230 to provide the reconstructed text 250.

The reconstructed text 250 may be used for a variety of applications, such as contextual question-answering, targeted product description generation, and text summarization. Since content and style may be separated, the content of the text may be reconstructed in any appropriate style. For example, taking a relatively verbose text and summarizing it may include representing the content of the text using a simpler style.

Figure 3:
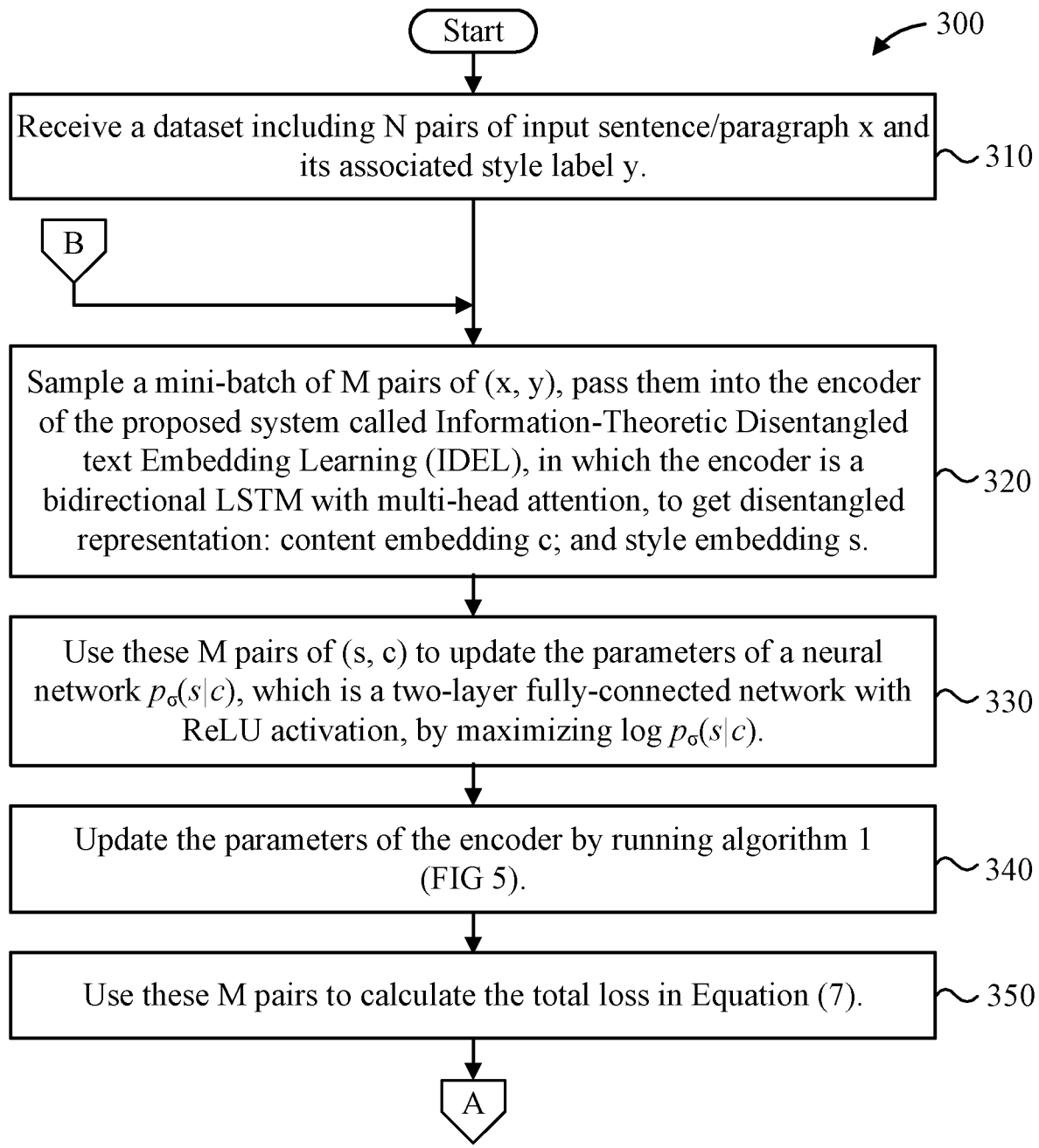
FIG. 3 is part of a flow diagram showing an exemplary method for controlled text generation with supervised representation disentanglement and mutual information minimization, in accordance with an embodiment of the present invention.
Figure 4:
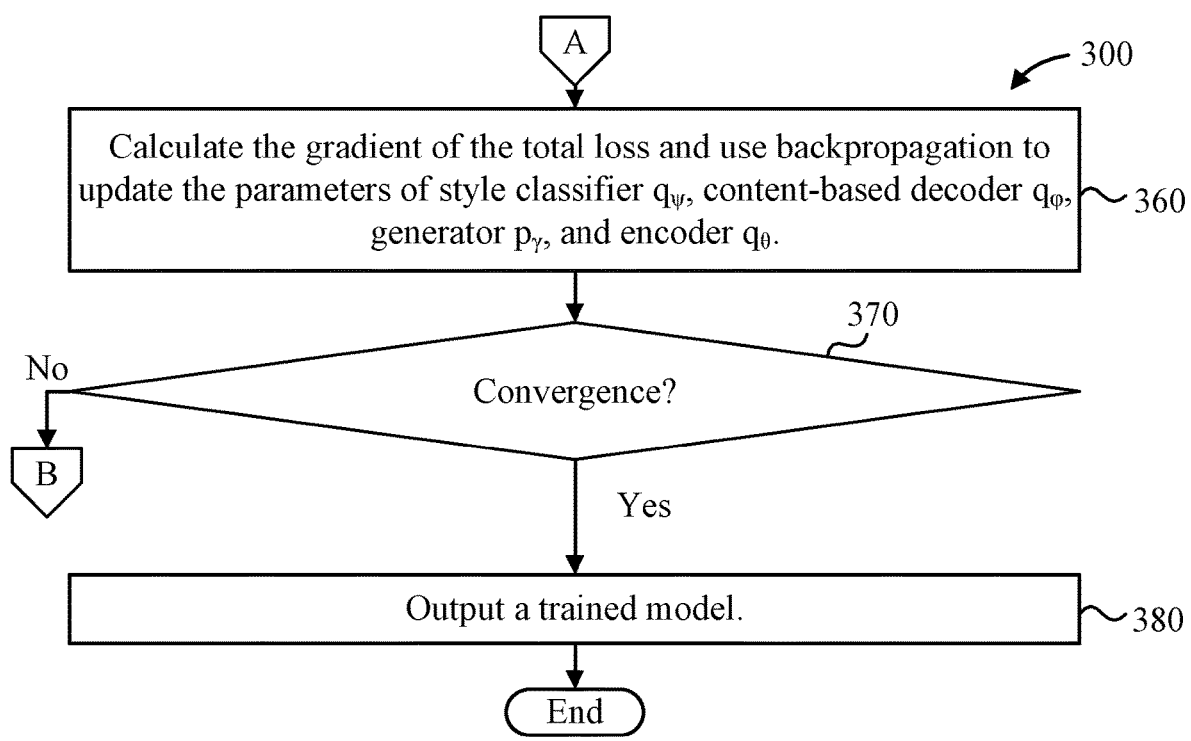
FIG. 4 is part of a flow diagram showing an exemplary method for controlled text generation with supervised representation disentanglement and mutual information minimization, in accordance with an embodiment of the present invention.

FIGS. 3-4 are flow diagrams showing an exemplary method 300 for controlled text generation with supervised representation disentanglement and mutual information minimization, in accordance with an embodiment of the present invention.

At block 310, receive a dataset including N pairs of input sentence/paragraph x and its associated style label y.

At block 320, sample a mini-batch of M pairs of (x, y), pass them into the encoder $q_\theta(s, c|x)$ of the proposed system called Information-Theoretic Disentangled text Embedding Learning (IDEL), in which the encoder is a bidirectional LSTM with multi-head attention, to get disentangled representation: content embedding c; and style embedding s.

At block 330, use these M pairs of (s, c) to update the parameters of a neural network $p_\omega(s|c)$, which is a two-layer fully-connected network with ReLU activation, by maximizing log $p_\omega(s|c)$.

At block 340, update the parameters of the encoder $q_\theta(s, c|x)$ by running algorithm 1 (see FIG. 5).

$$\mathcal{L}_{Dis}=I(s;c)-\mathbb{E}_{p(x,c)}[\log q_\phi(x|c)]-\mathbb{E}_{p(y,s)}[\log q_\psi(y|s)].$$

$$\mathcal{L}_{VAE}=KL(q_\theta(s,x|c)\|p(s,c))-\mathbb{E}_{q_\theta(s,c|x)}[\log p_\gamma(x|s,c)]. \quad (1)$$

$$\mathcal{L}_{total}=\beta\mathcal{L}_{Dis}+\mathcal{L}_{VAE} \quad (2)$$

At block 350, use these M pairs to calculate the total loss in Equation (2) without the Mutual Information (MI) term I(s; c) (the mutual information term has already been approximated in block 330 and block 340), in which β>0 is a hyperparameter, style classifier $q_\psi(y|s)$ is parameterized by a single fully-connected network with the softmax activation, the content-based decoder $q_\phi(x|c)$ is a one-layer unidirectional LSTM, the generator $p_\gamma(x|s, c)$ is built by a two-layer unidirectional LSTM plus a linear projection with output dimension equal to the vocabulary size, providing the next-word prediction based on previous sentence information and the current word.

At block 360, calculate the gradient of the total loss and use backpropagation to update the parameters of style classifier $q_\psi$, content-based decoder $q_\phi$, generator $p_\gamma$, and encoder $q_\theta$.

At block 370, determine if convergence has been reached. If so, the proceed to block 380. Otherwise, return to block 320.

At block 380, output a trained model.

FIG. 5 is a diagram showing exemplary pseudocode 500 for Algorithm 1, in accordance with an embodiment of the present invention.

FIG. 5 describes a step-by-step algorithm to update the parameters of the encoder of IDEL to approximately minimize the mutual information between content embedding c and style embedding s based on a new upper bound of mutual information MI between c and s.

Each sentence x is encoded into style embedding s and content embedding c. The style embedding s goes through a classifier q(y|s) to predict the style label y, while the content embedding c is used to reconstruct the information in the sentence x. A network p(s|c) helps disentangle the style and content embeddings for minimizing the mutual information, while a sample-based approximated mutual information term between s and c, MI(s; c), may also be minimized. The generator p(x|s, c) generates sentences based on the combination of s and c.

Figure 6:
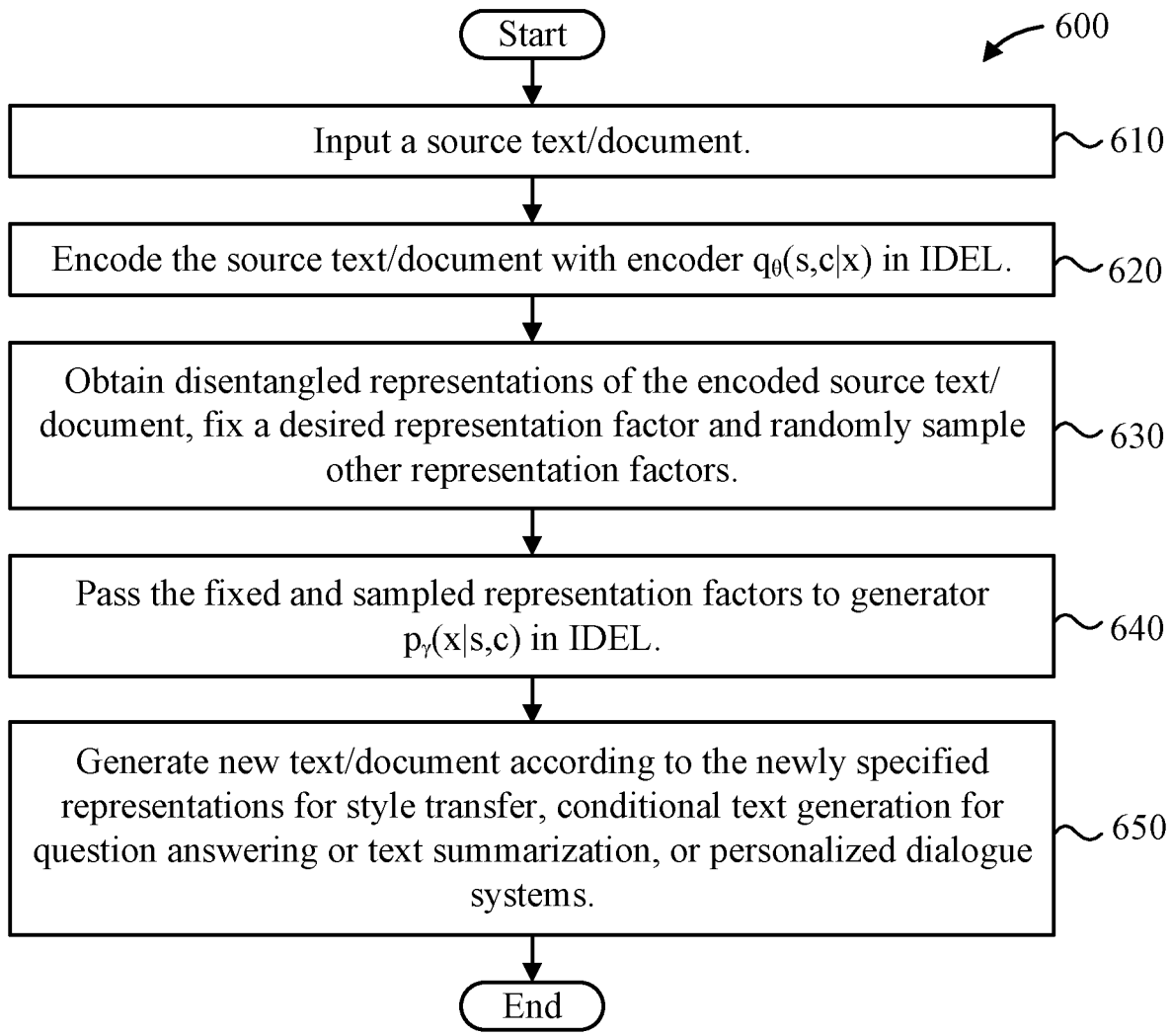
FIG. 6 is a flow diagram showing an exemplary method for new text/document generation, in accordance with an embodiment of the present invention.

FIG. 6 is a flow diagram showing an exemplary method 600 for new text/document generation, in accordance with an embodiment of the present invention.

At block 610, input a source text/document.

At block 620, encode the source text/document with encoder $q_\theta$(s, c|x) in IDEL.

At block 630, obtain disentangled representations of the encoded source text/document, fix a desired representation factor and randomly sample other representation factors. For example, fix a content embedding vector c while randomly sampling other factors such as style embedding vector s.

At block 640, decode the fixed and sampled representation factors with generator $p_\gamma$(x|s, c) in IDEL.

At block 650, generate new text/document according to the newly specified representations for style transfer, conditional text generation, or personalized dialogue systems. As noted above, in some applications, the content representation may be used to render the information of the original text in a new style, for example to provide answers to a user's questions or to summarize the text.

Figure 7:
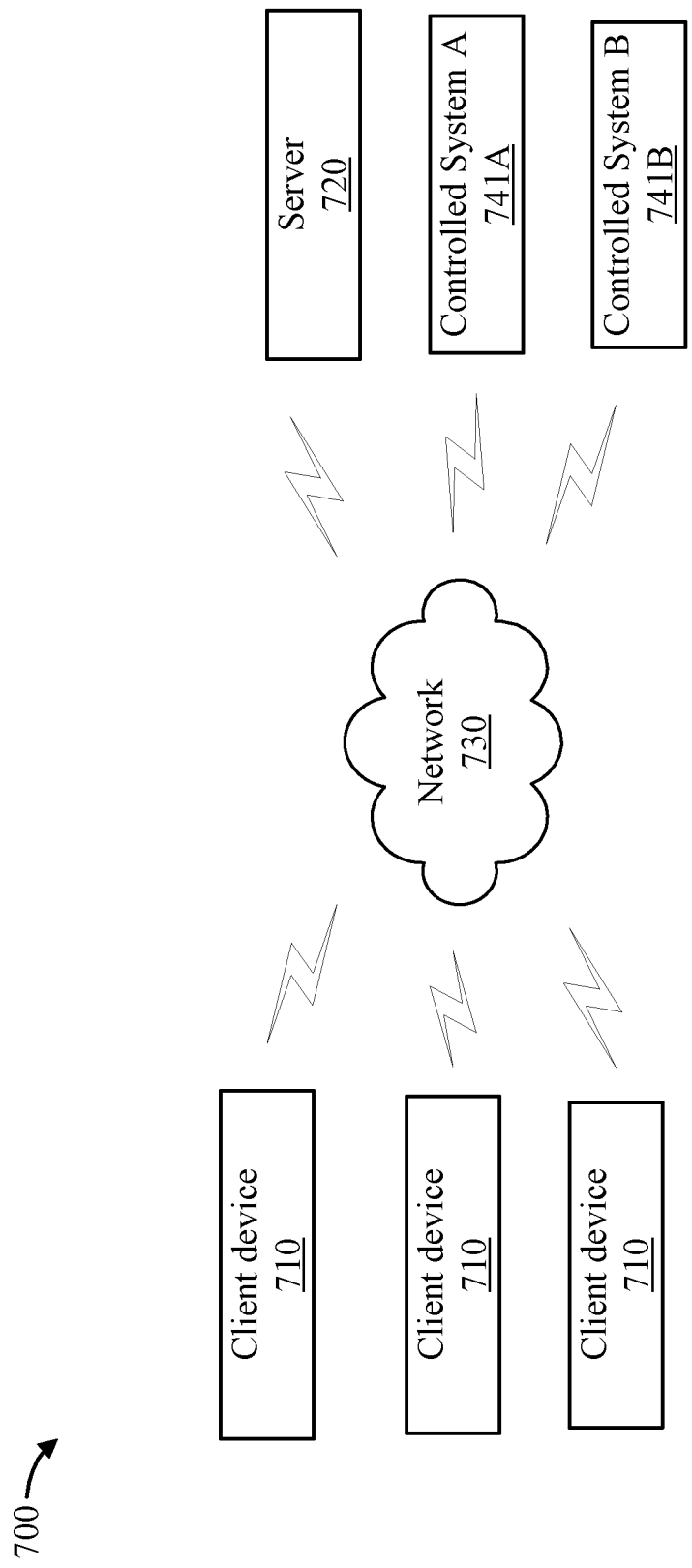
FIG. 7 is a block diagram showing an exemplary computing environment, in accordance with an embodiment of the present invention.

FIG. 7 is a block diagram showing an exemplary computing environment 700, in accordance with an embodiment of the present invention.

The environment 700 includes a server 710, multiple client devices (collectively denoted by the figure reference numeral 720), a controlled system A 741, a controlled system B 742.

Communication between the entities of environment 700 can be performed over one or more networks 730. For the sake of illustration, a wireless network 730 is shown. In other embodiments, any of wired, wireless, and/or a combination thereof can be used to facilitate communication between the entities.

The server 710 receives sequential data inputs from client devices 720. The server 710 may control one of the systems 741 and/or 742 based on a prediction generated from a disentanglement model stored on the server 710. In an embodiment, the sequential data inputs can relate to time series data that, in turn, relates to the controlled systems 741 and/or 742 such as, for example, but not limited to sensor data. Control can relate to turning an impending failing element off, swapping out a failed component for another operating component, switching to a secure network, and so forth.

A further description will be given of a method, in accordance with an embodiment of the present invention.

Suppose input data is given as $$\{(x_i, \mathcal{Y}_i)\}_{i=1}^{N}$$

where each $x_i$ is a sentence drawn from a distribution p(x) and $\mathcal{Y}_i$ is the label indicating the style of $x_i$. It is desired to encode each sentence $x_i$ into style embedding $s_i$ and content embedding $c_i$ with an encoder $q_\theta$(s, c|x), $$s_i, c_i | x_i \sim q_\theta = e(s, c | x). \tag{3}$$

In practice, the dimension of content embedding space is higher than the dimension of style embedding space, because the content always includes more information than the style does.

The collection of style embeddings $$\{s_i\}_{i=1}^{N}$$

be regarded as samples drawn from a variable s in the style embedding space, while the collection of content embeddings $$\{c_i\}_{i=1}^{N}$$

are samples from a variable c in the content embedding space.

To disentangle the style and content embeddings, the mutual information between s and c is minimized as I(s; c). Meanwhile, the latent embeddings s and c should sufficiently, respectively, include style information and content information from sentences x. Therefore, I(s; x) and I(c; x) are maximized at the same time. To sum up, the overall disentangled representation learning objective in accordance with an embodiment of the present invention is as follows:

$$\mathcal{L}_{Dis} = [I(s;c) - I(x;c) - I(x;s)].$$

A description will now be given regarding a theoretical justification to the objective, in accordance with an embodiment of the present invention.

The objective $\mathcal{L}_{Dis}$ has a strong connection with the dependence measurement in information theory. As described above, Variation of Information (VI) is a well-defined metric of independence between variables. Applying the triangle inequality to s, c and x, the following is obtained:

$$VI(s;x) + VI(x;c) \geq VI(s;c) \tag{4}$$

The equality reaches if and only if the information from variable x is totally separated into two independent variable s and c, which is an ideal scenario for disentangling sentence x into style embedding s and content embedding c. Therefore, the difference between left-hand side and right-hand side in Equation (4) measures the degree of disentanglement as follows:

$$D(x;s,c) = VI(s;x) + VI(x;c) - VI(c;s).$$

From Equation (4), it is known that D(x; $\mathcal{Y}$, z) is always non-negative. By the definition of VI in Equation (1), D(x; s, c) can be simplified to the following:

$VI(c;x)+VI(x;s)-VI(s;c)=2H(x)+2[I(s;c)-I(x;c)-I(x;s)]$.

Since $H(x)$ is a constant derived from data, only $I(s;c)-I(x;c)-I(x;s)$ is minimized, which is exactly the first term in our objective $\mathcal{L}_{Dis}$.

However, minimizing the exact value of mutual information in the objective $\mathcal{L}_{Dis}$ will cause numerical instability, especially when the dimension of latent embeddings is large. Therefore, several MI estimations are introduced herein to effectively learn disentangled representations.

A description will now be given of a MI variation lower bound, in accordance with an embodiment of the present invention.

Here, the lower bound estimation of objective terms $I(x; c)$, $I(x; s)$, and $I(s; \mathcal{Y})$ is discussed, which need to be maximized.

For $I(s; x)$, noting that $s \to x \to \mathcal{Y}$ is a Markov Chain, by the MI data-processing inequality, we have $I(s; x) \geq I(s; \mathcal{Y})$. Then, maximizing $I(s; x)$ is converted into maximizing the lower bound $I(s; \mathcal{Y})$.

For the other two terms $I(x; c)$ and $I(s; \mathcal{Y})$, the variational lower bound can be derived. Suppose $q_\theta(x|c)$ is a variational decoder, then the following applies:

$$I(c; x) = H(x) - H(x \mid c)$$
$$= H(x) + \mathbb{E}_{p(x,c)}[\log p(x \mid c)]$$
$$= H(x) + \mathbb{E}_{p(x,c)}[\log q_\theta(x \mid c)]$$
$$+ \mathbb{E}_{p(c)}[KL(p(x \mid c) \| q_\theta(x \mid c))]$$
$$\geq H(x) + \mathbb{E}_{p(x,c)}[\log q_\theta(x \mid c)]$$

Figure 8:
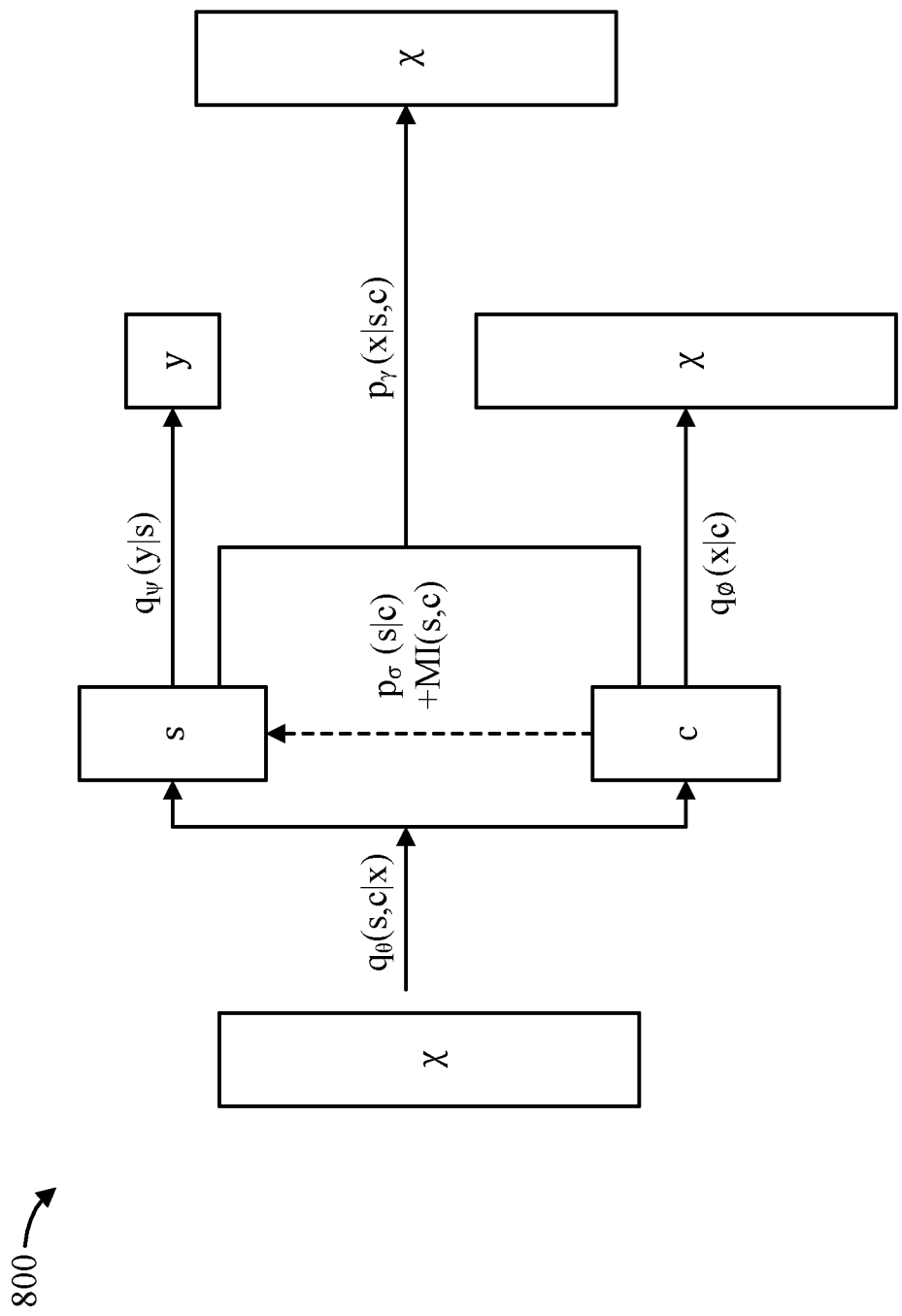
FIG. 8 is a block diagram showing an exemplary framework, in accordance with an embodiment of the present invention.

FIG. 8 is a block diagram showing an exemplary framework 800, in accordance with an embodiment of the present invention. Each sentence x is encoded into style embedding s and content embedding c. The style embedding s goes through a classifier $q_\psi(\mathcal{Y}/s)$ to predict the style label $\mathcal{Y}$; the content embedding c is used to reconstruction the information of x. A network $p_\sigma(s|c)$ helps disentangle style and content embeddings. The generator $p_\gamma(x|s, c)$ generates sentences based on the combination of s and c.

Here the inequality is based on the fact that the Kullback-Leibler (KL) divergence is always non-negative. Similarly, introducing the variational distribution $q_\psi(s|\mathcal{Y})$, another variational lower bound for $I(s; \mathcal{Y})$ can be obtained as $I(s; \mathcal{Y}) \geq H(\mathcal{Y}) + \mathbb{E}_{p(\mathcal{Y}, s)}[\log q_\psi(\mathcal{Y}|s)]$. Based on three lower bounds derived herein, an upper bound for the objective is obtained as follows:

$\mathcal{L}_{Dis} \leq I(s;c) - H(x) - \mathbb{E}_{p(x,c)}[\log q_\phi(x|c)] - [H(\mathcal{Y}) - \mathbb{E}_{p(\mathcal{Y}, s)}[\log q_\psi(\mathcal{Y}|s)]]$ Noting both $H(x)$ and $H(\mathcal{Y})$ are constant numbers from the data, only the following needs to be minimized:

$\bar{\mathcal{L}}_{Dis} = I(s;c) - \mathbb{E}_{p(x,c)}[\log q_\phi(x|c)] - [\log q\psi(\mathcal{Y}|s)]$ (5)

An intuitive explanation is given to $\bar{\mathcal{L}}_{Dis}$. The style embedding s and content embedding c are expected to be independent by minimizing mutual information $I(s; c)$, while they also need to be representative: the style embedding s is encouraged to give better prediction of style label $\mathcal{Y}$ by maximizing $\mathbb{E}_{p(\mathcal{Y}, s)}[\log q_\psi(\mathcal{Y}|s)]$; the content embedding should maximize the log-likelihood $\mathbb{E}_{p(x, c)}[\log q_\phi(x|c)]$ to include sufficient information from sentence x.

A description will now be given regarding a MI sample-based upper bound, in accordance with an embodiment of the present invention.

To estimate $I(s; c)$, a novel sample based upper bound is proposed. Assume there are M latent embedding pairs $$\{(s_j, c_j)\}_{j=1}^{M}$$

drawn from $p(s, c)$. As shown in Theorem 3.1, an upper bound of mutual information is derived based on the samples.

Theorem 3.1. if $(s_j, c_j) \sim p(s, c)$, $j=1, \ldots, M$, then $$I(s;c) \leq \mathbb{E}\left[\frac{1}{M}\sum_{j=1}^{M} R_j\right] = : \hat{I}(s, c), \quad (6)$$

$$\text{where } R_j = \log p(s_j \mid c_j) - \frac{1}{M}\sum_{k=1}^{M} \log p(s_j \mid c_k).$$

Based on Theorem 3.1, given embedding samples $$\{s_j, c_j\}_{j=1}^{M}, \frac{1}{M}\sum_{j=1}^{M} R_j$$

can be minimized as an unbiased upper bound of $I(s; c)$. To calculate $R_j$, the condition distribution $p(s|c)$ is required. Two solutions are proposed to obtain the conditional distribution $p(s|c)$: (1) using the Bayesian rule, derive the $p(s|c)$ from the variational encoder distribution $p(s, c|x)$ and $p(c|x)$; (2) using a neural network $p(s|c)$ to approximate $p(s|c)$. In practice, the first approach is not numerically stable. Here we mainly focus on the neural network approximation.

In implementation of the upper bound in Equation (6), M sentence $\{x_j\}$ is first encoded into the encoder $q_\theta(s, c|x)$ to obtain the sampled embedding pairs $\{(s_j|c_j)\}$. Then the condition distribution $p_\sigma(c|x)$ is trained by maximizing the loglikelihood $$\frac{1}{M}\sum_{j=1}^{M} \log p_\sigma(s_j \mid c_j).$$

After the training of $p_\sigma((s|c)$ is finished, $R_j$ is calculated for each embedding pair $(s_j, c_j)$. Finally, the gradient for $$\frac{1}{M}\sum_{j=1}^{M} R_j$$

is calculated and back-propagated to the encoder $q_\theta(s, c|x)$. The reparameterization trick is applied to ensure the gradient back-propagating through the sampled embeddings $(s_j, c_j)$. When the encoder weights update, the distribution $q_\theta(s, c|x)$ changes, which leads to the changing of conditional distribution $p(s/c)$. Therefore, the approximation network $p_\sigma(s|c)$ needs to be updated again. Consequently, in the training scheme, the encoder network $q_\theta(s, c|x)$ and the approximation network $p_\sigma(s|c)$ are alternatively updated.

Similarly, another MI upper bound can be derived based on the conditional distribution $p(c|s)$. However, the neural network approximation to $p(s/c)$ has lower performance than the approximation to $p(c|s)$. That is because the dimension of c is much higher than the dimension of s, which leads to p(c|s) a high-dimensional distribution. Alternatively, the lower-dimensional distribution p(s|c) is relatively easier to approximate with neural networks.

A description will now be given regarding an encoder/decoder framework, in accordance with an embodiment of the present invention.

One important downstream task for disentangled representation learning (DRL) is conditional generation. The MI-based text DRL method of the present invention can be also embedded into a Encoder-Decoder generative model and be trained in an end-to-end scheme.

Since the proposed DRL encoder $q_\theta(s, c|x)$ is a stochastic neural network, a natural extension is adding a decoder to build a variational autoencoder. Therefore, another decoder network $p_\gamma(x|s, c)$ is introduced which generates a new sentence based on given style s and content c. In the variational autoencoder (VAE), a prior distribution $p(s, c)=p(s)p(c)$ may be used to regularize the posterior distribution $q_\theta(s, c|x)$ by KL-divergence minimization. At the same time, the generation log-likelihood should be encouraged. In formula, the VAE objective is as follows:

$$\mathcal{L}_{VAE}=KL(q_\theta(s,c|x)\|p(s,c))-\mathbb{E}_{q_\theta(s,c|x)}[\log p_\gamma(x|s,c)].$$

Referring back to equation (1), an additional regularization may be defined as $\mathcal{L}_{reg}=\mathcal{L}_{Dis}+MI(s; c)$, with the additional mutual information term being defined as:

$$MI(s;c)=KL(q(s,c)|q(s)q(c))=f(q(s,c))-f(q(s))-f(q(c))$$

where $f(\bullet)=E_{q(s,c)} \log(\bullet)$ and $E_{q(s,c)}$ is the expectation with respect to q(s, c). This term may be approximated using a mini-batch weighted sampling estimator:

$$E_{q(s,c)}[\log q(z)] \approx \frac{1}{M}\sum_{i=1}^{M}\log\sum_{j=1}^{M}q(z(x_i)\mid x_j)+C$$

where M is a size of the mini-batch and C is a constant.

The VAE objective and the regularization term are combined together to form an end-to-end learning framework (as shown in FIG. 8). The total loss function may therefore be expressed as:

$$\mathcal{L}_{total}=\mathcal{L}_{VAE}+\lambda\mathcal{L}_{reg} \quad (7)$$

where λ is a hyper-parameter reweighting the regularization and the VAE objective.

After the regularized VAE is trained on a large-scale dataset, with supervised and self-supervised information being available to learn different types of disentangled semantic factors, the corresponding disentangled factors (e.g., writing style, content, or other components) can be replaced for conditional text generation, contextual question answering, and contextual text summarization. To generate a summarized text according to a specific style s, a content vector c can be set to be the representation vector learned from a text to be summarized. The style s can be set to the target style. Then the decoder can generate the desired summarized text.

Figure 9:
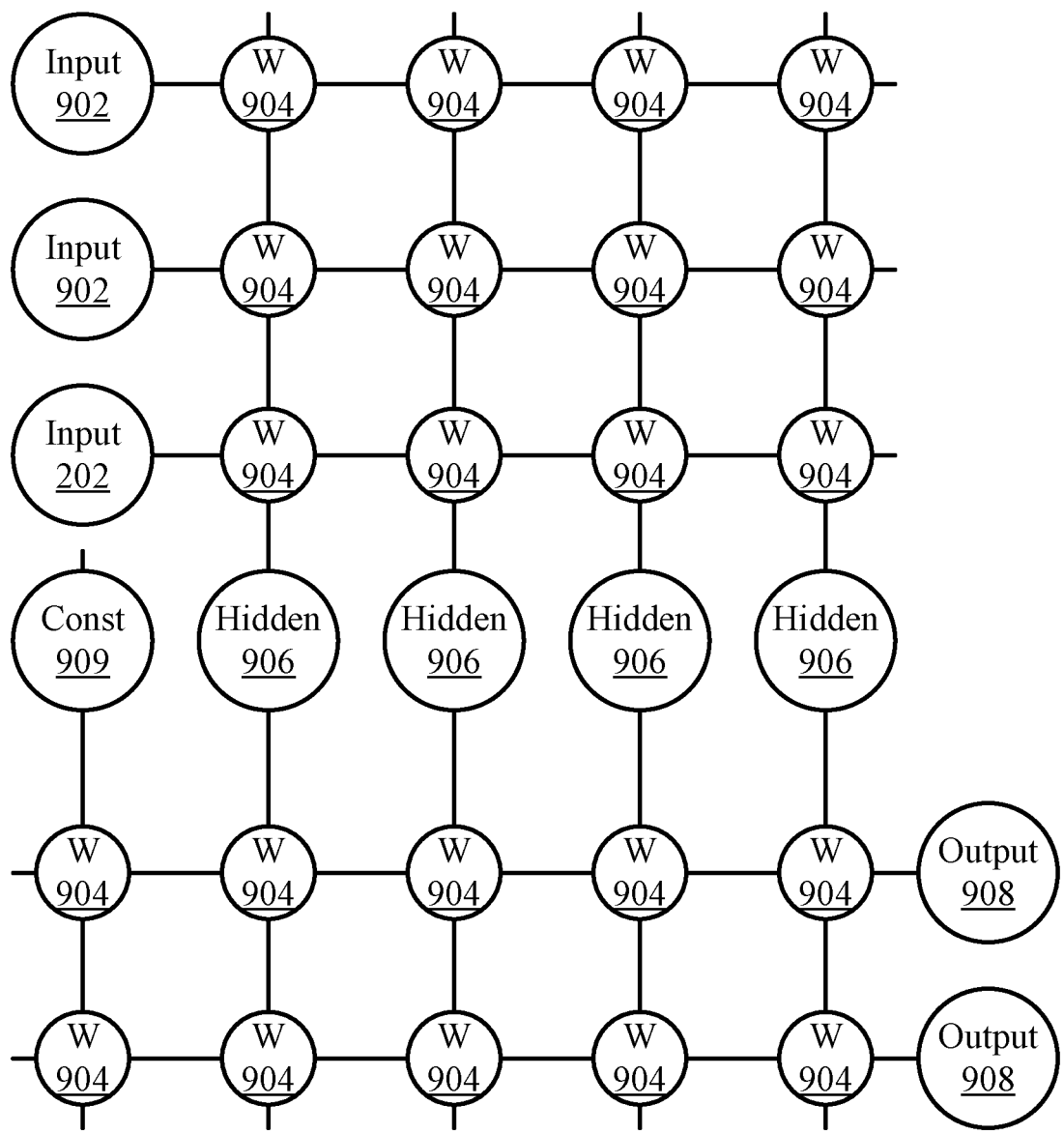
FIG. 9 is a block diagram of a neural network architecture, in accordance with an embodiment of the present invention.

Referring now to FIG. 9, an artificial neural network (ANN) architecture 900 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 902 each provide an input signal in parallel to a respective row of weights 904. The weights 904 each have a respective settable value, such that a weight output passes from the weight 904 to a respective hidden neuron 906 to represent the weighted input to the hidden neuron 906. In software embodiments, the weights 904 may simply be represented as coefficient values that are multiplied against the relevant signals. The signals from each weight adds column-wise and flows to a hidden neuron 906.

The hidden neurons 906 use the signals from the array of weights 904 to perform some calculation. The hidden neurons 906 then output a signal of their own to another array of weights 904. This array performs in the same way, with a column of weights 904 receiving a signal from their respective hidden neuron 906 to produce a weighted signal output that adds row-wise and is provided to the output neuron 908.

It should be understood that any number of these stages may be implemented, by interposing additional layers of arrays and hidden neurons 906. It should also be noted that some neurons may be constant neurons 909, which provide a constant output to the array. The constant neurons 909 can be present among the input neurons 902 and/or hidden neurons 906 and are only used during feed-forward operation.

During back propagation, the output neurons 908 provide a signal back across the array of weights 904. The output layer compares the generated network response to training data and computes an error. The error signal can be made proportional to the error value. In this example, a row of weights 904 receives a signal from a respective output neuron 908 in parallel and produces an output which adds column-wise to provide an input to hidden neurons 906. The hidden neurons 906 combine the weighted feedback signal with a derivative of its feed-forward calculation and stores an error value before outputting a feedback signal to its respective column of weights 904. This back propagation travels through the entire network 900 until all hidden neurons 906 and the input neurons 902 have stored an error value.

During weight updates, the stored error values are used to update the settable values of the weights 904. In this manner the weights 904 can be trained to adapt the neural network 900 to errors in its processing. It should be noted that the three modes of operation, feed forward, back propagation, and weight update, do not overlap with one another.

Figure 10:
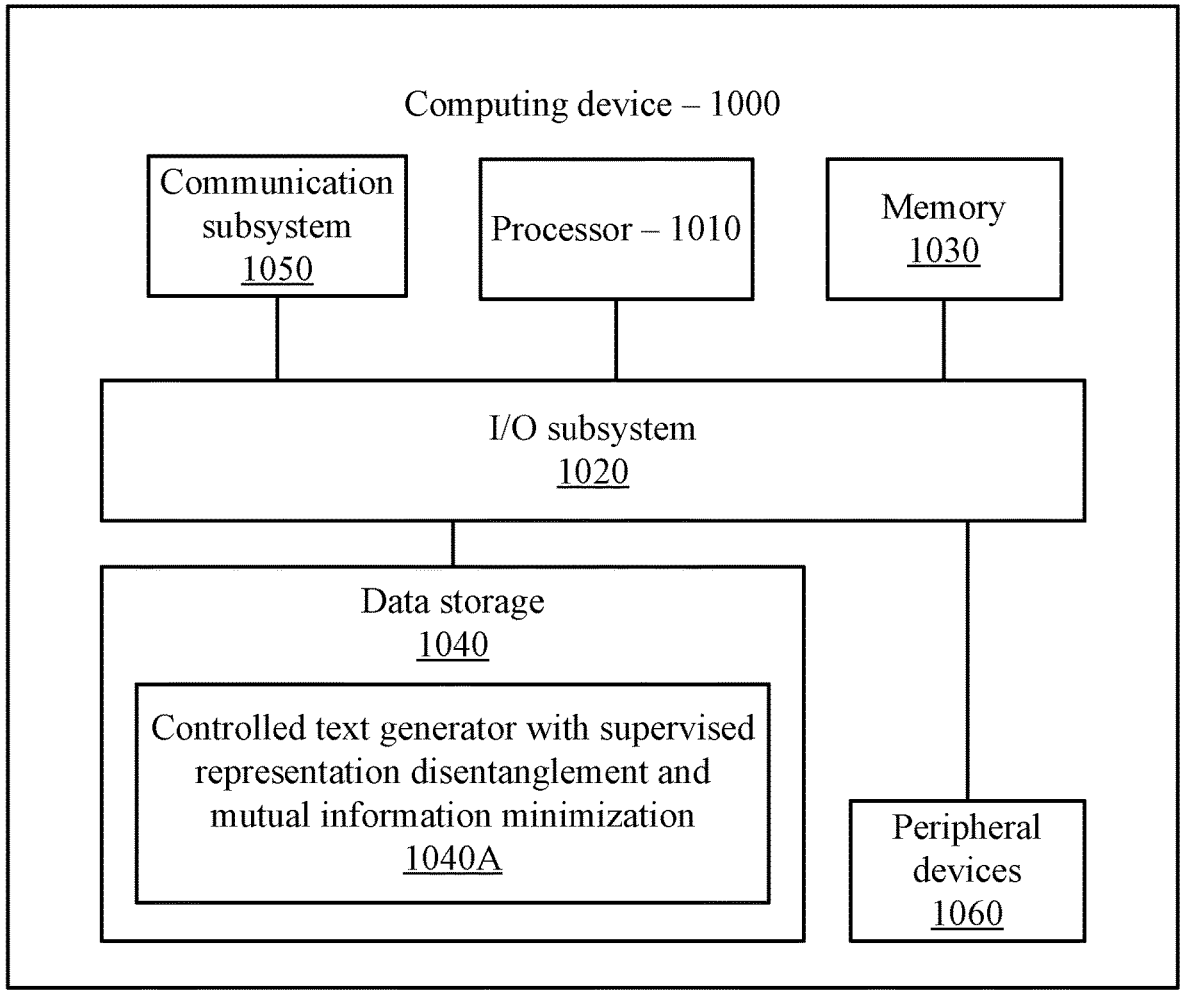
FIG. 10 is a block diagram showing an exemplary computing device, in accordance with an embodiment of the present invention.

FIG. 10 is a block diagram showing an exemplary computing device 1000, in accordance with an embodiment of the present invention. The computing device 1000 is configured to perform controlled text generation with supervised representation disentanglement and mutual information minimization.

The computing device 1000 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 1000 may be embodied as a one or more compute sleds, memory sleds, or other racks, sleds, computing chassis, or other components of a physically disaggregated computing device. As shown in FIG. 10, the computing device 1000 illustratively includes the processor 1010, an input/output subsystem 1020, a memory 1030, a data storage device 1040, and a communication subsystem 1050, and/or other components and devices commonly found in a server or similar computing device. Of course, the computing device 1000 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 1030, or portions thereof, may be incorporated in the processor 1010 in some embodiments.

The processor 1010 may be embodied as any type of processor capable of performing the functions described herein. The processor 1010 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 1030 may be embodied as any type of volatile or non-volatile memory or data storage capable of performing the functions described herein. In operation, the memory 1030 may store various data and software used during operation of the computing device 1000, such as operating systems, applications, programs, libraries, and drivers. The memory 1030 is communicatively coupled to the processor 1010 via the I/O subsystem 1020, which may be embodied as circuitry and/or components to facilitate input/output operations with the processor 1010 the memory 1030, and other components of the computing device 1000. For example, the I/O subsystem 1020 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 1020 may form a portion of a system-on-a-chip (SOC) and be incorporated, along with the processor 1010, the memory 1030, and other components of the computing device 1000, on a single integrated circuit chip.

The data storage device 1040 may be embodied as any type of device or devices configured for short-term or long-term storage of data such as, for example, memory devices and circuits, memory cards, hard disk drives, solid state drives, or other data storage devices. The data storage device 1040 can store program code for a controlled text generator with supervised representation disentanglement and mutual information minimization. The communication subsystem 1050 of the computing device 1000 may be embodied as any network interface controller or other communication circuit, device, or collection thereof, capable of enabling communications between the computing device 1000 and other remote devices over a network. The communication subsystem 1050 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 1000 may also include one or more peripheral devices 1060. The peripheral devices 1060 may include any number of additional input/output devices, interface devices, and/or other peripheral devices. For example, in some embodiments, the peripheral devices 1060 may include a display, touch screen, graphics circuitry, keyboard, mouse, speaker system, microphone, network interface, and/or other input/output devices, interface devices, and/or peripheral devices.

Of course, the computing device 1000 may also include other elements (not shown), as readily contemplated by one of skill in the art, as well as omit certain elements. For example, various other input devices and/or output devices can be included in computing device 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 1000 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for disentangled data generation, comprising:
    accessing a dataset including a plurality of pairs, each formed from a given one of a plurality of input text structures and a given one of a plurality of style labels for the plurality of input text structures;
    training an encoder neural network to disentangle a sequential text input into disentangled representations, including a content embedding and a style embedding, based on a subset of the dataset, using an objective function that includes a regularization term that minimizes mutual information between the content embedding and the style embedding, wherein the objective function is:

$$\mathcal{L}_{VAE} + \lambda \mathcal{L}_{reg}$$

wherein $\lambda$ is a hyperparameter reweighting a regularization $\mathcal{L}_{reg}$ and a variational autoencoder objective $\mathcal{L}_{VAE}$, where $\mathcal{L}_{reg}$ is expressed as $\mathcal{L}_{Dis} + MI(s; c)$, including a disentanglement loss $\mathcal{L}_{Dis}$ and a mutual information term $MI(s; c)$ based on a style embedding s and a content embedding c; and
    training a generator neural network to generate a text output that includes content from the style embedding, expressed in a style other than that represented by the style embedding of the text input.

2. The computer-implemented method of claim 1, wherein the encoder neural network includes a multi-head attention neural network unit for performing disentanglement.

3. The computer-implemented method of claim 1, further comprising updating model parameters using the subset of the dataset as mini-batches by maximizing a log-likelihood of an input text in a variational autoencoder framework.

4. The computer-implemented method of claim 1, wherein the generator neural network includes a two-layer unidirectional LSTM neural network having an output dimension equal to a vocabulary size of a vocabulary from which the next word prediction is generated.

5. The computer-implemented method of claim 1, wherein in a subsequent testing sequence, the method further comprises:
    fixing one of the disentangled representations while randomly sampling another one of the disentangled representations; and
    decoding the fixed one of the disentangled representations with the randomly sampled other one of the disentangled representations.

6. The computer-implemented method of claim 1, wherein the input text structures are selected from the group consisting of sentences and paragraphs.

7. The computer-implemented method of claim 1, further comprising disentangling a new text input, using the trained encoder neural network, into a new content embedding and a new style embedding.

8. The computer-implemented method of claim 7, further comprising generating a new text output using the generator neural network, based on the new content embedding, to perform at least one of style transfer, conditional text generation for question answering or text summarization, or personalized dialogue systems.

9. The computer-implemented method of claim 8, wherein generating the new text output is further based on a style embedding that is different from the new style embedding.

10. A system for disentangled data generation, comprising:
    a hardware processor; and
    a memory that stores:
        a dataset including a plurality of pairs, each formed from a given one of a plurality of input text structures and a given one of a plurality of style labels for the plurality of input text structures; and
        computer program code which, when executed by the hardware processor, implements:
        training code that trains an encoder neural network to disentangle a sequential text input into disentangled representations, including a content embedding and a style embedding, based on a subset of the dataset, using an objective function that includes a regularization term that minimizes mutual information between the content embedding and the style embedding, and that trains a generator neural network to generate a text output that includes content from the style embedding, expressed in a style other than that represented by the style embedding of the text input, wherein the objective function is:

$$\mathcal{L}_{VAE} + \lambda \mathcal{L}_{reg}$$

wherein $\lambda$ is a hyperparameter reweighting a regularization $\mathcal{L}_{reg}$ and a variational autoencoder objective $\mathcal{L}_{VAE}$, where $\mathcal{L}_{reg}$ is expressed as $\mathcal{L}_{Dis} + MI(s; c)$, including a disentanglement loss $\mathcal{L}_{Dis}$ and a mutual information term $MI(s; c)$ base on a style embedding s and a content embedding c.

11. The system of claim 10, wherein the encoder neural network includes a multi-head attention neural network unit for performing disentanglement.

12. The system of claim 10, wherein the training code further updates model parameters using the subset of the dataset as mini-batches by maximizing a log-likelihood of an input text in a variational autoencoder framework.

13. The system of claim 10, wherein the generator neural network includes a two-layer unidirectional LSTM neural network having an output dimension equal to a vocabulary size of a vocabulary from which the next word prediction is generated.

14. The system of claim 10, wherein the training code further:
- fixes one of the disentangled representations while randomly sampling another one of the disentangled representations; and
- decodes the fixed one of the disentangled representations with the randomly sampled other one of the disentangled representations.

15. The system of claim 10, wherein the input text structures are selected from the group consisting of sentences and paragraphs.

16. The system of claim 10, wherein the computer program code further implements disentangling code that disentangles a new text input, using the trained encoder neural network, into a new content embedding and a new style embedding.

17. The system of claim 16, wherein the computer program code further implements generating code that generates a new text output using the generator neural network, based on the new content embedding, to perform at least one of style transfer, conditional text generation for question answering or text summarization, or personalized dialogue systems.

18. The system of claim 17, wherein the new text output is further based on a style embedding that is different from the new style embedding.

\* \* \* \* \*